April 3, 1951 C. E. SWENSON 2,547,236
MULTIPLE SPEED DRIVE
Filed Feb. 17, 1947 4 Sheets-Sheet 3
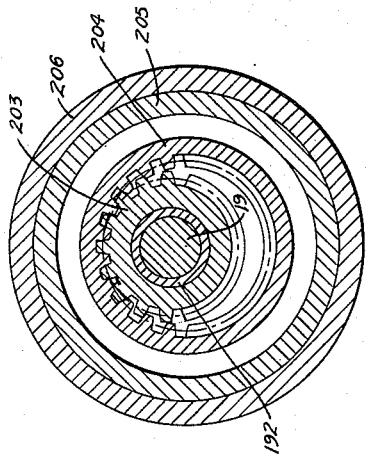
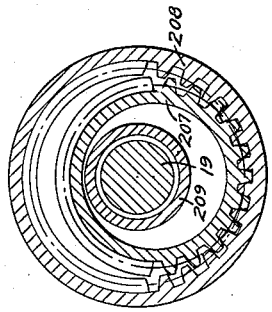
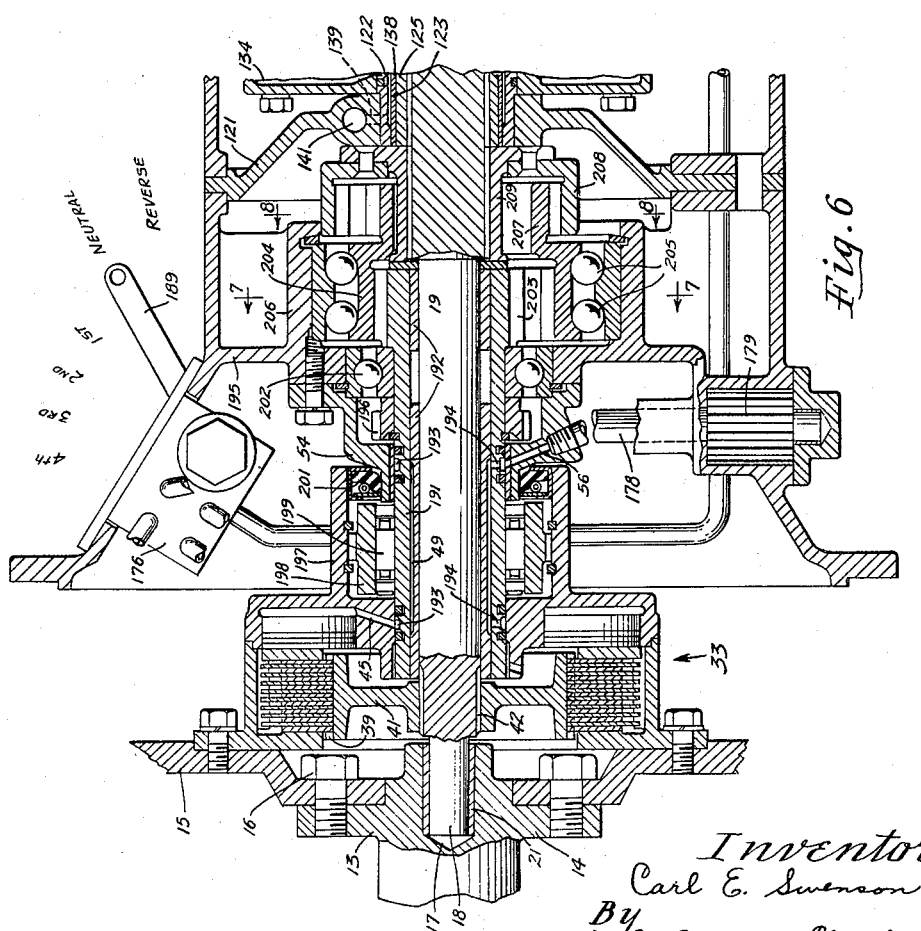
Inventor
Carl E. Swenson
By
McCanna and Morsbach
Attys.

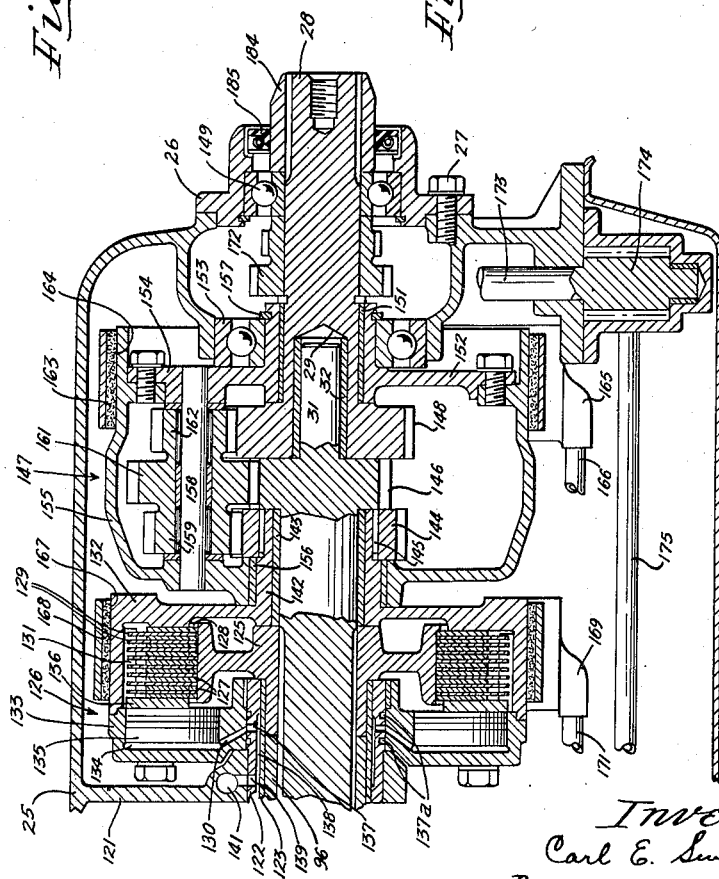
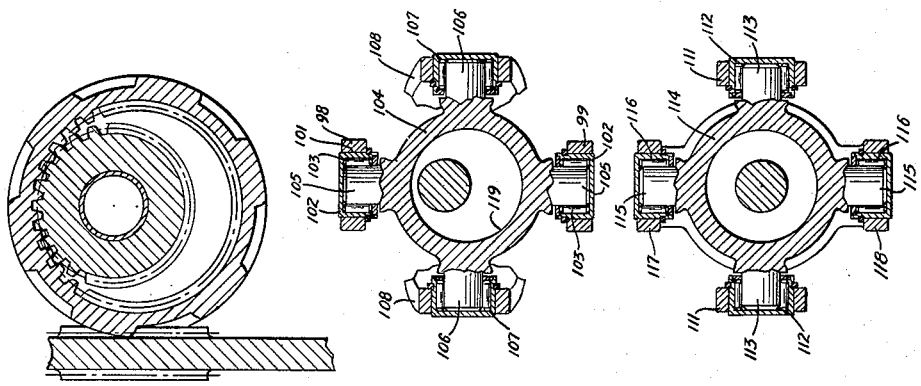
Fig. 2  Fig. 3  Fig. 4  Fig. 5
Inventor
Carl E. Swenson
By McCanna and Morsbach
Attys.

April 3, 1951  C. E. SWENSON  2,547,236
MULTIPLE SPEED DRIVE
Filed Feb. 17, 1947  4 Sheets-Sheet 4
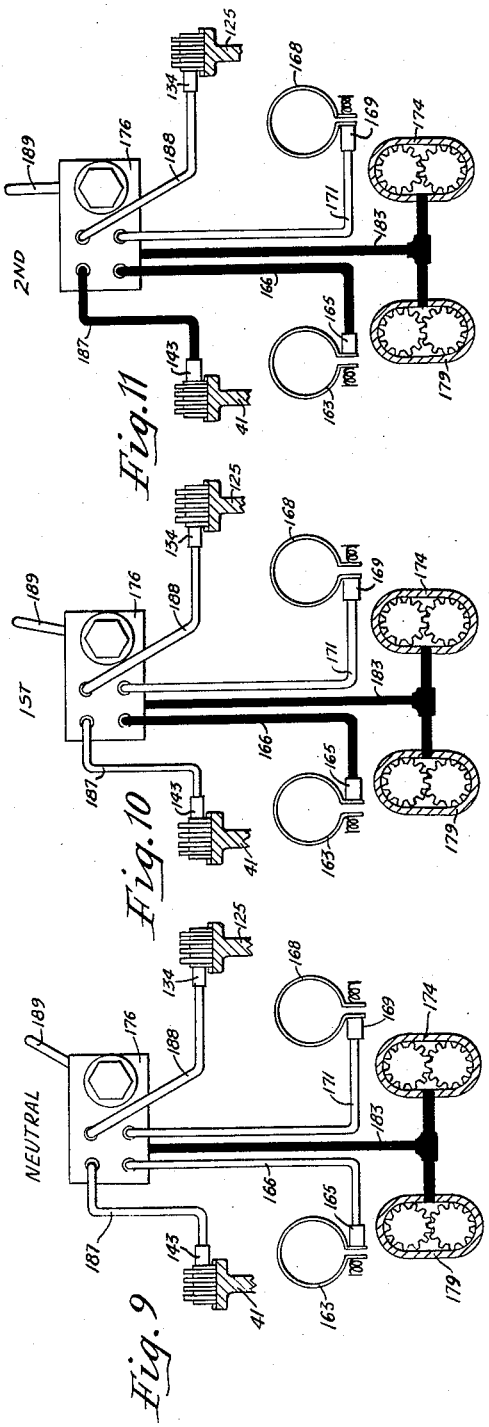
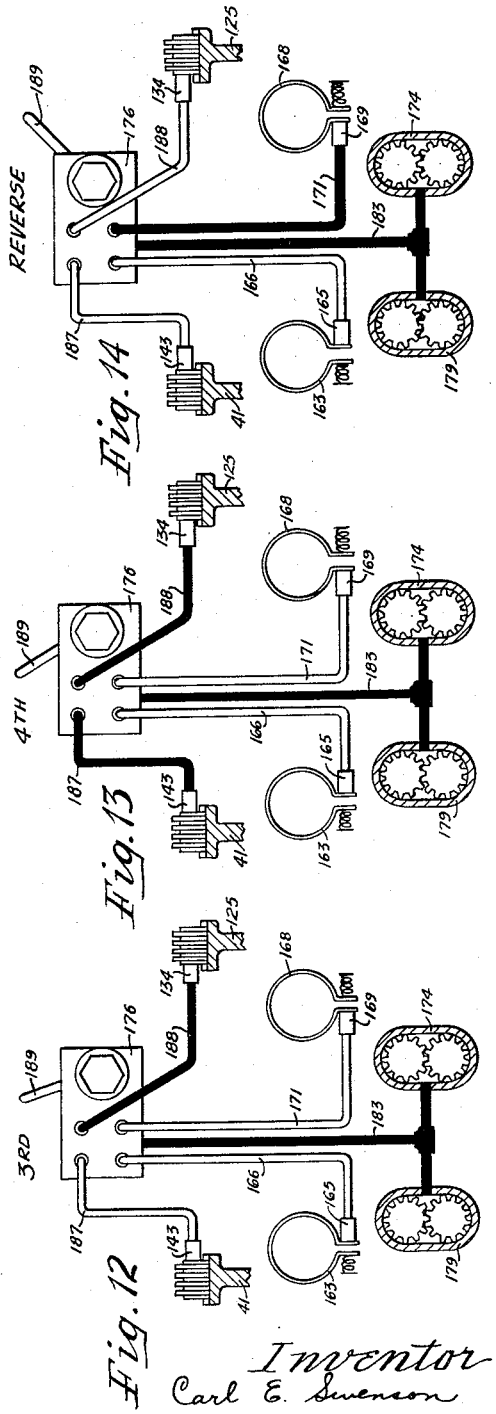
Inventor
Carl E. Swenson
By McCanna and Morsbach
Attys.

Patented Apr. 3, 1951

2,547,236

UNITED STATES PATENT OFFICE 2,547,236

MULTIPLE-SPEED DRIVE

Carl E. Swenson, Rockford, Ill.

Application February 17, 1947, Serial No. 729,001

8 Claims. (Cl. 74—732)

This invention relates to multiple speed power transmissions, and has special reference to a change speed transmission of novel construction.

An important object of the invention is the provision of an improved transmission having two quiet and highly efficient speed ratios.

Another object is the provision of a transmission driving through a pair of external-internal gears having a minimum amount of gear tooth action between gears to produce a structure having a minimum of noise, maximum efficiency, and long life.

A further object is the provision of a transmission wherein a single two-speed and reverse planetary gear set is driven selectively by direct drive or through a pair of external-internal gears.

A further object is the provision of a speed change device employing a single pair of engaging gear surfaces and universal joints to bring power at both speeds to a common shaft.

Another object of the invention is the provision of a change speed transmission which may include a fluid drive, wherein the change from one speed to another may be accomplished without interrupting the flow of power.

Other objects and advantages will appear from the following description and the accompanying drawings, in which:

Figures 1 and 2 taken together constitute a longitudinal section through a change speed transmission embodying my invention;

Fig. 3 is a fragmentary section on the line 3—3 of Figure 1, showing the internal-external gear set;

Fig. 4 is a section on the line 4—4 of Figure 1 showing the eccentrically positioned universal joint;

Fig. 5 is a section on the line 5—5 of Figure 1;

Fig. 6 is a section similar to Figure 1 showing a modified structure;

Fig. 7 is a section on the line 7—7 of Fig. 6;

Fig. 8 is a section on the line 8—8 of Fig. 6, and

Figs. 9 through 14 are diagrammatic views showing the hydraulic control system in the various positions of the controls.

Figure 1:
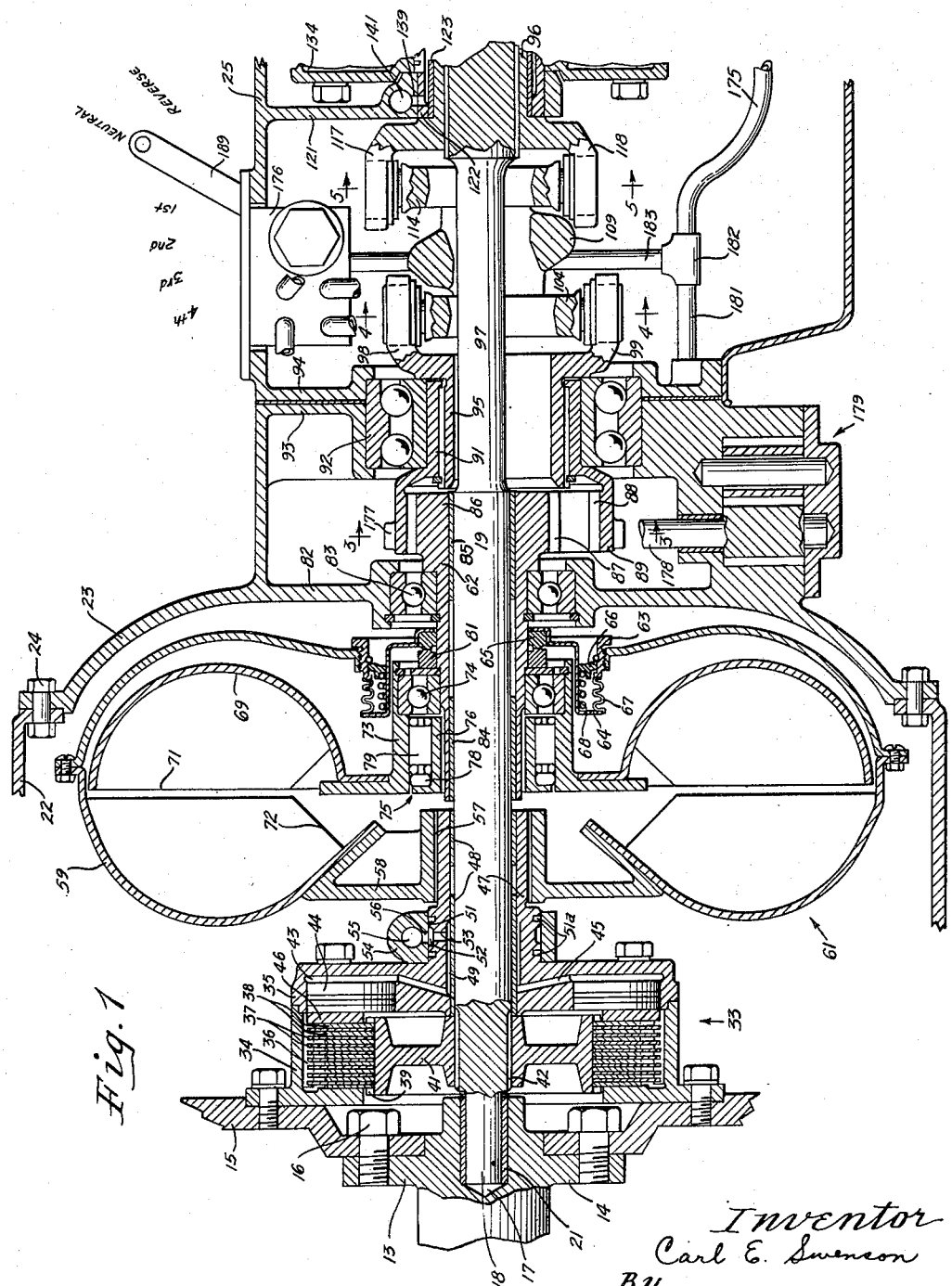

The invention is herein shown for purposes of illustration as embodied in a change speed transmission for automotive use, though obviously the invention is not limited to such use, and in this construction the numeral 13 designates a driving member comprising the shaft of an engine or other prime mover and has a flange 14 for the attachment thereto of a conventional flywheel 15 by annularly spaced bolts 16. The shaft 13 has a bore 17 for the reception in coaxial alignment of the end 18 of a main shaft or driven member designated generally by the numeral 19, the end 18 constituting a pilot support for the end of the shaft and a sleeve bearing 21 being disposed between the end of the shaft and the bore.

The transmission in the form shown in Figure 1 is enclosed within a transmission housing, which includes a housing member 22 in this instance attached to the motor block in the conventional manner, a housing member 23 secured to the end of the housing member 22 by annularly spaced bolts 24, a housing member 25 secured to the housing member 23 by bolts, not shown, and a cap 26 secured to the end of the housing member 25 by bolts 27, the cap 26 functioning in the support of a stub shaft 28 presently to be more fully described, which stub shaft has a bore 29 for the reception of a pilot end 31 of the shaft or driven member 19, a sleeve bearing 32 being disposed between the pilot end and the bore 29. Thus the end 18 of the shaft 19 is rotatably carried in the driving shaft 13, while the opposite end 31 thereof is rotatably supported in the stub shaft 28.

Attached to the flywheel 15, and consequently directly connected to the shaft 13, is a clutch 33 which includes a clutch casing including body 34 and cover 35. The body has a plurality of ribs or teeth 36 which carry spaced clutch plates 37, and interposed between the clutch plates are friction disks 38 slidably carried on teeth 39 disposed on the outer periphery of an inner clutch member or hub 41, the hub being attached to the shaft 19 through splines or keys 42 so as to rotate with the shaft. The cover 35 has a plurality of cylinders 43 carrying pistons 44 and has a plurality of channels 45 for admitting liquid into the cylinders 43 for the purpose of moving the pistons outward against an annular plate 46 to urge the clutch plates and the friction disks into frictional engagement so as to cause the shaft 19 to rotate as a unit with the engine shaft 13. Conversely release of the fluid pressure within the cylinders 43 permits the plates and disks to separate so that the clutch casing 35 may rotate independently of the shaft 19. The cover 35 has a hub 47 encircling the shaft 19 and supported thereon by sleeve bearings 48, an internal annular recess 49 being provided in the hub for communication with the channels 45. The hub also has a cylindrical outer surface 51 provided with an annular recess 52 communicating with the internal recess 49 through holes 53. Mounted on the cylindrical surface 51 is a stationary collector ring 54 provided with a chamber 55 communicating with a source of fluid pressure as will be later described, this chamber communicating with the recess 52 through a plurality of openings 56 so that when fluid pressure is applied to the chamber 55 it is transmitted from this chamber through the opening 56, the annular recess 52, the hole 53, the internal recess 49 and the channels 45 to the cylinders 43 in the clutch mechanism. Seals 51a, which may be in the form of conventional piston rings, are seated in annular recesses on opposite sides of the annular groove 52. The hub 47 also has an externally splined portion 57 provided with external keys or splines and supporting a hub 58 forming part of an impeller 59 of an hydraulic coupling designated generally by the numeral 61. The opposite side of the impeller is supported on a sleeve shaft 62 surrounding the shaft 19 through a sealed bearing comprising an annular ring 63 attached to the impeller, a shell 64 attached to a collar 65 bearing on the sleeve 62, and an intermediate retainer ring 66 interposed between the ring 63 and the shell 64. A flexible bellows seal 67 and a spring 68 complete the bearing seal. A runner 69 is disposed within the impeller housing 59 and has a plurality of annularly spaced vanes 71 cooperating with vanes 72 of the impeller in the usual fashion to provide an hydraulic coupling such as well known in the art. The runner 69 has a hub 73 surrounding the tubular shaft 62 and supported thereon by a conventional ball bearing 74 and forming the outer race of a one-way clutch designated generally by the numeral 75. This one-way clutch may be of any conventional design, and in this instance comprises an inner race 76 splined or keyed onto the sleeve 62 and retained in place by any conventional means, the inner bore of the hub 73 being cylindrical so that the hub forms the outer race of the clutch. A plurality of rollers 78 form a roller bearing between the two races, and also interposed between the races is a plurality of tiltable grippers 79 arranged in accordance with the usual one-way clutch construction. A carbon washer 81 is interposed between the collar 65 and the bearing 74 so that these parts are urged into proper running relationship by the bearing spring 68 to effect a seal in this area and prevent the escape of liquid from within the impeller.

While I have shown and described an hydraulic coupling interposed between the engine shaft 13 and the tubular shaft 62, the presence of such a coupling at this point is not essential to all phases of the invention, and certain of the advantages of the invention will result if the hub 73 forming the outer race of the one-way clutch is fixedly connected to the driving member either by direct connection to the casing of the clutch 33 or to the flywheel 15 as illustrated in Fig. 6.

The housing member 23 has a cross wall 82 through which the shaft 19 and the sleeve shaft 62 pass, the wall having an opening for the reception of a ball bearing 83, the inner race of which seats on the outer surface of the sleeve shaft 62. The shaft 19 is supported in the bore of the sleeve shaft 62 by sleeve bearings 84 and 85. Disposed on the end of the sleeve shaft 62, encircling the driven member 19, and coaxial therewith is a gear 86 having external teeth 87 as best shown in Fig. 3 cooperating with internal teeth 88 of an eccentric gear 89 also encircling the driven member 19. The gear 89 has a hub 91 supported in a double ball bearing 92 supported in cross walls 93 and 94 of the housing members 23 and 25, this hub being connected to the shaft 19 through a power train comprising in the embodiment of Figure 1 a pair of close coupled universal joints. Disposed within the hub 91 and splined or keyed thereto is one hub 95 of a pair of close coupled universal joints, the other hub of these joints being indicated by the numeral 96 and being splined or keyed to the shaft 19 at a point spaced from the hub 95 as will be apparent from Figure 1, the shaft 19 having a portion 97 of reduced diameter between the areas carrying the gear 86 and the hub 96.

The hub 95 forms part of the yoke of a universal joint which includes arms 98 and 99 (see Fig. 4), the arms having openings 101 for the reception of caps 102 which form roller bearing races supporting roller bearings 103. Positioned on the arms is a cross 104 having opposed trunnions 105 carried in the bearings. The cross also has opposed trunnions 106 supported in like bearings 107 mounted in spaced arms 108 of an intermediate ring 109 (Fig. 1). The ring 109 also has spaced arms 111 carrying roller bearings 112 in which trunnions 113 of a cross 114 are rotatably supported, the cross having diametrically opposed trunnions 115 mounted in roller bearings 116 carried in yoke arms 117 and 118 integral with the yoke hub 96. The crosses 104 and 114 each have a central opening as shown at 119 for the passage of the portion 97 of the shaft 19 as will be apparent from Figs. 1, 4 and 5. The yoke hub 96 has bearing support in a depending wall 121 of the housing member 25 through a sleeve 122 and a sleeve bearing 123 which also provides support for the shaft 19 at this point.

Attention is directed to the fact that the portion of the device heretofore described constitutes a two-speed change speed transmission for driving the shaft 19 at either of two speeds depending upon whether the clutch 33 is engaged or disengaged. When the clutch 33 is disengaged, power is transmitted from the driving shaft 13 through the clutch housing to the hub 47, thence through the splined portion 57 to the impeller 59 which drives the runner 69 causing the one-way clutch 79 to drive the sleeve shaft 62 and the gear 86. The gear 86 drives the eccentric gear 89 which in turn drives the hub 95. The power is then transmitted through the universal joints, bringing the power transmission elements back into concentricity with the hub 96 at which point the hub 96 drives the shaft at a lower speed. On the other hand, when the clutch 33 is engaged, power is transmitted through the clutch plates 37 and disks 38 directly to the shaft 19 at the splines or keys 42 driving the shaft at a higher rate of speed. In this position of the parts, motion is transmitted back from the yoke hub 96 through the universal joints, through the eccentric gears 89 and 86 to the one-way overrunning clutch 75 which overruns due to the greater speed of the inner race member 76. The runner 69 and impeller 59 are likewise in motion at a slower speed driven from the housing of the clutch 33.

The end of the shaft or driven member 19 is connected into and forms the driving element of a two speed and reverse planetary gear set 147 enclosed within the housing member 25, a hub 125 of a second clutch designated generally by the numeral 126 being splined or keyed onto the shaft 19 (Fig. 2) adjacent the hub 96. The hub 125 carries a plurality of spaced friction disks 127 slidable on teeth 128. Interposed between the friction disks are clutch plates 129 slidable on teeth 131 on the inner surface of a clutch casing body 132. A clutch casing cover 133 is attached to the body 132 and has bearing support on the outer surface of the sleeve 122, this cover having a plurality of cylinders 134 carrying pistons 135 adapted to bear against a plate 136 to urge the friction disks and the clutch plates into engagement. Channels 130 connect the cylinders 134 to openings 137 in the sleeve 122, which sleeve has an annular internal recess 138 communicating with a channel 139 opening into a chamber 141 connected to a supply of hydraulic fluid from which fluid is supplied to the cylinders 134 to actuate the pistons. The sleeve 122 also has annular recesses on opposite sides of the openings 137 for the reception of seals 137a similar to the seals 51a. The clutch body 132 has a hub 142 supported on the shaft 19 through a sleeve bearing 143 and an external gear 144 is carried on the hub, affixed thereto by means of splines or keys 145. An external sun gear 146 is concentrically carried on the shaft 19 directly adjacent the pilot end 31. An external gear 148 concentric with the shaft 19 is integral with the stub shaft 28 and serves to transmit power thereto. The stub shaft 28 is supported on a ball bearing 149 disposed in the cap 26 and also has support through a sleeve bearing 151 and a hub 152 on a ball bearing 153 disposed in a boss of the housing member 28. The hub 152 is part of a cover plate 154 of the casing of the planetary gear casing and is bolted to a casing member 155 which is supported on the hub 142 through a sleeve bearing 156. The ball bearing 153 is retained in position by a snap ring 157 disposed on the hub 152. A plurality of countershafts 158 (commonly 3 in number) are fixed at opposite ends in the cover plate 154 and the casing member 155. Each of the countershafts 158 carry a plurality of planet spur gears 159, 161 and 162 which in this instance are integral, the gears 159 being disposed in intermeshing relation with the sun gear 144, the gears 161 being in intermeshing relationship with the sun gear 146 and the gears 162 being in intermeshing relationship with the gear 148.

A friction brake band 163 is fixedly supported on the housing member 25 and encircles the gear casing member 155 and is adapted to bear against a cylindrical surface 164 thereof, the band having an hydraulic cylinder and piston 165 of conventional design for tightening the band on the surface 164 in response to the application of pressure thereto through a fluid pressure pipe 166. Likewise the clutch body 132 of the clutch 126 has a braking surface 167 and a brake band 168 is disposed therearound adapted to be forced into engagement by a cylinder and piston 169 also of conventional design, when fluid pressure is applied thereto through a conduit 171.

Positioned on the stub shaft 28 is a gear 172 which meshes with gear teeth on a pump shaft 173 connected to a pump 174 which acts to pump oil or other pressure liquid into a pressure conduit 175 delivering the same to a control valve 176. The gear 89 also has external teeth 177 meshing with a pump shaft 178 driving a conventional gear pump designated generally by the numeral 179 which delivers pressure fluid under pressure into a conduit 181 joining the conduit 175 as shown at 182, and delivering to the control valve 176 through a common conduit 183.

Splined or keyed to the end of the stub shaft 28 is a driven shaft 184, and a seal 185 is disposed between the cap 26 and the driven shaft. The driven shaft 184 may be a conventional torque tube or other means by which power is transmitted away from the transmission.

By way of specific example, the sun gear 146 may be a twenty-four tooth gear, the gear 144 may be a thirty tooth gear, the gear 148 may be a thirty-three tooth gear, the gears 161 may have twenty-two teeth, the gears 159 may have sixteen teeth, and the gears 162, thirteen teeth. The external gear 86 may suitably have twenty-three teeth and the gear 189 thirty teeth. Under these circumstances in low speed there will be a gear ratio of 3.05:1, in second speed a gear ratio of 2.32:1, in third speed a ratio of 1.315:1, and in fourth speed a ratio of 1:1.

Figs. 6, 7 and 8 show a modification of that portion of the transmission shown in Figure 1, the complete transmission of this embodiment comprising the structures of Figs. 6 and 2. This embodiment shows a structure operating on a substantially similar principle in which similar results are accomplished by alternative structure.

This embodiment also includes the shaft 19 supported in the driving member 13 by the pivot end 18, the opposite end carrying the sun gear 146 (Fig. 2) and having a splined portion carrying the hub 125 of the clutch 136, with the sleeve bearing 123 and sleeve 122 interposed between the clutch and the shaft and between the shaft and a housing wall or spider 121. In this instance the cover of the clutch 33 has bearing support on a sleeve or tubular shaft 191 surrounding the shaft 19, sleeve bearings 192 being interposed between the shaft and the sleeve, one of the sleeve bearings having the annular recess 49 communicating with the channels 45 and with the bore 56 through annular recesses 193 and holes 194 in the sleeve 191. The collector ring 54 is in this form disposed on the outer surface of sleeve 191 and is attached to a web 195 of the housing and provides a chamber enclosing a gear 196 for driving the pump shaft 178.

The cover of clutch 33 has a boss 197, surrounding the tubular shaft 191, and carrying on its inner surface, the outer race 198 of a conventional one-way clutch indicated generally by the numeral 199 similar to the clutch 75, the tubular shaft 191 forming the inner race of the clutch. A seal 201 is interposed between the boss 197 and the collector ring 54. The shafts 19 and 191 having support in the web 195 though a ball bearing 202 and the shaft 191 carries at its end an external gear 203, in this case integral with the shaft and concentric with the shafts. The gear 203 meshes with an internally toothed gear 204 eccentrically disposed with respect to the shafts and carried on a double race ball bearing 205 supported in a cage 206 on the web 195.

Carried on the internally toothed gear 204 is an eccentric externally toothed gear 207 disposed beyond the end of the tubular shaft 191 and meshing with an internally toothed gear 208 concentric with the shaft 19, the gear in this instance being secured to a hub 209 splined or keyed to the shaft 19.

It will be seen that, as in the structure of Figure 1, when the clutch 33 is engaged the shaft 19 is driven directly from the driving member 13. The gears 208, 207, 204, and 203 and the sleeve 191 idle and the clutch 199 overruns. When the clutch 33 is disengaged the drive is through the one way clutch 199, the shaft 191 and the above intermediate gear sets to the shaft 19 to drive the shaft at a different speed as determined by the ratios of the gears. There is thus provided a two speed drive similar in principle to that of Figure 1 with the exception that in the form of Fig. 6 a second internal-external gear set is utilized in place of the universal joints to perform a similar function. It will be seen that the controls of Figs. 9 through 14 are equally applicable to the structure of Figs. 6 and 2 and operate in the same way producing the same results.

In Figs. 9 through 14 the fluid pressure circuits, together with the control elements of the mechanism, are shown in diagrammatic form. The control valve 176 functions to divert pressure fluid from the supply conduit 183 through various distribution conduits to control the drive through the transmission, these distribution conduits including the conduit 166 connected to the band 163, the conduit 171 connected to the band 168, a conduit 187 connected to the chamber 55 and through this chamber to the cylinders 43 of the clutch 33, and a conduit 188 connected from the valve to the chamber 141 and through this chamber to the cylinders 134 of the clutch 126. In these figures the heavily shaded conduits indicate those in which actuating pressure exists. The valve 176 may be a conventional plug type valve operated by movement of a lever 189 and having ports communicating with ports in the valve body to provide the flows described, the specific details of the valve being no part of the present invention. The lever 189 may be directly operated or may be remotely operated by suitable control levers, rods or other suitable means and may be used in connection with a suitable scale indicating the gear positions.

When the lever 189 of the valve occupies the position shown in Figs. 1 and 9, the transmission is in neutral position in which motion is not transmitted to the driven member 184. In this position of the parts no pressure fluid is transmitted to any of the distribution pipes 166, 171, 187, and 188, as a result of which the clutch 133 is disengaged, the clutch 126 is disengaged, the brake band 168 is out of engagement with the housing member 132, and the band 163 is out of engagement with the surface 164. Under these circumstances the casing of clutch 33 rotates, driving the impeller 59 and, unless the shaft 13 is turning very slowly, also driving the runner 69 which in turn drives the universal joints and the shaft 19. The shaft 19 and the sun gear 146 drives the planetary housing in idling movement.

When the valve lever 189 is moved to the position shown in Fig. 10, the first gear ratio is obtained, the valve admitting pressure to the distribution line 166 as indicated by the shading of this line in Fig. 10. This causes the band 163 to frictionally engage the surface 164 and thereby prevent the casing of the planetary gears from rotating. Power is then transmitted from the shaft 13 through the drum of the clutch 33 through the hydraulic coupling to the shaft 62, thence through the eccentric gears 86 and 89 to the universal joints to the shaft 19 rotating this shaft and the sun gear 146. The gear 146 drives the various gears 161 causing rotation of the gears 162, which in turn drive the gear 148 causing rotation of the stub shaft 28 and the driven shaft 184. At the same time the gears 159 drive the gear 144 and the casing of the clutch 126, but since the clutch is disengaged, this runs idly. This provides a gear ratio which is equal to that between the eccentric gears 86 and 89 minus the gear reduction which occurs between the sun gear 146 and the gears 161 and that which occurs between the gears 162 and the gear 148.

When the valve lever 189 is moved to the third position as shown in Fig. 11, a second driving speed is obtained. As a result of this movement fluid pressure is admitted to both the conduits 166 and the conduit 187 so that the band 163 is engaged and the clutch 33 is brought into engagement by action of the pistons 44. This produces a direct drive between the casing of clutch 33 and the shaft 19 so that the shaft 19 is rotated, rotating the sun gear 146 and transmitting power through the same gear train as in the previous position of the lever. In this position of the parts the universal joints are rotated from the hub 96 driving the gear N, which in turn drives the gear M and the shaft 62, the shaft 62 turning at a more rapid rate of speed than the impeller 69, the clutch at 79 overrunning to permit this idling of the parts.

When the lever 189 is moved to the fourth position as indicated in Fig. 12, a third driving speed is obtained. This movement of the valve relieves the fluid pressure in the conduits 166 and 187 and admits fluid pressure to the conduit 188 admitting fluid pressure in the cylinders 134 of the clutch 126 and bringing the clutch plates 129 into engagement with the friction disks 127. The clutch 33 is now disengaged and power is transmitted through the clutch casing through the hydraulic coupling, the overrunning clutch at 79, the gears 86 and 89 and the universal joints to the shaft 19. The clutch 126 being engaged, the sleeve 142 thereof is locked to the shaft for rotation therewith, and likewise the gear 144. This locks up the clutch, the gears 144 and 146, and the gears of the planetary transmission permitting the casing 147 and the clutch 146 to rotate as a unit, thereby driving the stub shaft 28 in a direct drive as dictated by the gear ratio between the gears 86 and 89.

Movement of the valve lever 189 from the position of Fig. 12 to that of Fig. 13 causes actuating fluid pressure to be admitted to the conduit 187, thereby adjusting the transmission to produce a fourth speed at the driven member 184. Admission of pressure to the conduit 187 causes the clutch 33 to engage so that the drive to the shaft 19 is through the clutch hub 41. The clutch plates 129 and the friction disks 127 remain engaged and the planetary unit consequently remains locked up, thus giving a direct drive from the shaft 13 to the driven shaft 184. In this position of the parts the one-way clutch at 79 overruns in the manner heretofore described.

To cause the driven shaft 184 to rotate in a direction opposite to the direction of rotation of the driving shaft 13, the lever 189 is moved to the position shown in Fig. 14, in which position actuating fluid pressure is applied slowly to the distribution line 171 causing the band 168 to frictionally engage the surface 167 and hold the casing of the clutch 126 against rotation. The clutch 33 is open and therefore the drive is through the clutch casing through the hydraulic coupling and the one-way clutch, the eccentric gears 86 and 89, and the universal joints to the shaft 19. The sun gear 146 on the shaft 19 drives the planetary gears 161, 159, and 162. The casing of the clutch 126 being held stationary by action of the band 168, the gear 144 is likewise stationary. Since the gear 148 is larger than the gear 144, rotation of the planetary gears causes the planetary gear casing 147 to reverse its direction of rotation and likewise causes reversal of direction of rotation of the gear 148, the stub shaft 28 and the driven member 184.

I claim:

1. A multiple speed drive comprising a driving member, a driven member, direct coupling clutch means for effecting the rotation of said driven member by said driving member at the same speed, an internally toothed gear rotatably mounted eccentrically about one of said members, an externally toothed annular gear mounted concentrically about said one member within said internally toothed gear and rotatable by the latter, clutch means for driving one of said gears by said driving member, power-transmitting means comprising a pair of close coupled universal joints coupling the other of said gears with the other of said members to drive the driven member at another speed determined by the ratio of said internal and external gears, one of said clutch means comprising a one-way overrunning clutch, and means for engaging and disengaging the direct coupled clutch means.

2. A multiple speed drive comprising a driving member and a driven member in coaxial alignment, two selective driving means for driving the driven member from the driving member, one of said driving means comprising a clutch interposed between said members for direct drive, the other of said driving means comprising a pair of intermeshing internal and external gears encircling the axis of said members, one of said gears being concentric with said members and the other gear being eccentric therewith, a pair of close coupled universal joints for connecting the eccentric gear with one of said members, and a second clutch interposed in the other of said driving means, and means for engaging and disengaging at least one of said clutches to selectively drive the driven member.

3. A multiple speed drive comprising a driving member and a driven member arranged in coaxial alignment, two means for driving the driven member from the driving member, one of said driving means comprising a clutch interposed between said members for direct drive, the other of said driving means including in series, a hydraulic coupling, clutch means, a pair of intermeshing internal and external gears, one of said gears being concentric with said members and the other gear being eccentric therewith, and a pair of universal joints for connecting the eccentric gear with one of said members, and means for engaging and disengaging at least one of said clutches to selectively drive the driven member.

4. A multiple speed drive comprising a driving member and a driven member arranged in coaxial alignment, two means for driving the driven member from the driving member, one of said driving means comprising a clutch interposed between said members for direct drive, the other of said driving means including in series, a hydraulic coupling, clutch means, a pair of intermeshing internal and external gears encircling the axis of said members, one of said gears being concentric with said members and the other gear being eccentric therewith, and a pair of universal joints for connecting the eccentric gear with one of said members, one of said clutches comprising a one-way overrunning clutch, and means for engaging and disengaging the other of said clutches to selectively drive the driven member.

5. A selective speed drive comprising a rotatable driving member, a rotatable driven member in axial alignment with the driving member, first clutch means for coupling said members to drive the driven member at one speed, alternate means for driving the driven member at a different speed including tubular shaft means encircling the driven member and rotatable relative thereto, said shaft means being concentric with the axis of rotation of said members, a first set of intermeshing internal and external gears encircling the rotational axis of said members, said external gear being concentric with respect to said axis and the internal gear being eccentric therewith, a second set of intermeshing internal and external gears encircling the rotational axis of said members, said external gear of the second set being eccentric with respect to said axis and said internal gear of said second set being concentric therewith, said external gear of the second set being rigid with said internal gear of the first set and said internal gear of the second set being rigid with said driven member and second clutch means for selectively coupling said driving member to said driven member said tubular shaft means and said first and second gear sets, said second clutch means comprising a one-way clutch for overrunning movement between the driving and driven members when the other clutch means is engaged.

6. A multiple speed drive comprising a driving member, a rotatable driven member, said members being in axial alinement, clutch means for coupling said members to drive the driven member at one speed, alternately selectable means for driving the driven member at a different speed including a fluid coupling, intermeshing internal and external gears encircling the rotational axis of said members, one of said gears being concentric with respect to said axis and the other being eccentric therewith, clutch means for selectively coupling one of said gears with one of said members through said fluid coupling and a pair of close coupled universal joints coupling the other of said members with the eccentric gear to drive said driven member at said different speed, one of said clutch means comprising a one-way clutch for overrunning movement between the drive and driven members when the other clutch means is engaged.

7. A multiple speed drive comprising a rotatable driving member, a rotatable driven member, first clutch means for coupling said members to drive the driven member at one speed, alternately selectable means for driving the driven member at a different speed including intermeshing internal and external gears encircling the rotational axis of said members, one of said gears being concentric with respect to said axis and the other being eccentric therewith, second clutch means for selectively coupling one of said gears with one of said members and a pair of close coupled universal joints surrounding said other member and coupling it with the eccentric gear to drive said driven member at said different speed, one of said clutch means comprising a one-way clutch for overrunning movement between the driving and driven members when the other clutch means is engaged.

8. A multiple speed drive having coaxial rotatable driving and driven members, gear means encircling one of said members and rotatable concentrically about the axis of said one member, clutch means for releasably coupling the concentric gear means for rotation with the other of said members, eccentrically positioned gear means encircling said member having driving connection with the concentric gear means, and a power train coupling between the eccentric gear means and said one member whereby the driven member is rotatably driven through both of said gear means when said clutch is engaged, said power train comprising a pair of annular members surrounding said one member and transversely pivotally engaged respectively with said one member and said eccentric gear means, and a coupling member transversely pivotally engaged respectively with each of said annular members at positions substantially 90 degrees displaced from their points of engagement with the gear means and one of said members.

CARL E. SWENSON.

REFERENCES CITED

The following references are of record in the file of this patent:

UNITED STATES PATENTS

| Number | Name | Date |
|---|---|---|
| 1,026,073 | Bulley | May 14, 1912 |
| 1,845,332 | Reece et al. | Feb. 16, 1932 |
| 1,900,119 | Lysholm | Mar. 7, 1933 |
| 1,946,154 | Fawick | Feb. 6, 1934 |
| 1,991,124 | Sharpe | Feb. 12, 1935 |
| 2,037,787 | Hughes | Apr. 21, 1936 |
| 2,102,634 | Lysholm | Dec. 21, 1937 |
| 2,170,644 | Banker | Aug. 22, 1939 |
| 2,324,733 | Smirl | July 20, 1943 |
| 2,350,810 | Pentz | June 6, 1944 |
| 2,372,817 | Dodge | Apr. 3, 1945 |

FOREIGN PATENTS

| Number | Country | Date |
|---|---|---|
| 679,091 | France | Apr. 8, 1930 |